(12) United States Patent
Lee (10) Patent No.: US 11,831,546 B2
(45) Date of Patent: Nov. 28, 2023

(54) RELAY NODE, RELAY NETWORK SYSTEM AND OPERATING METHOD THEREOF

(71) Applicant: ELECTRONICS AND TELECOMMUNICATIONS RESEARCH INSTITUTE, Daejeon (KR)

(72) Inventor: Changhyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 637 days.

(21) Appl. No.: 17/097,248

(22) Filed: Nov. 13, 2020

(65) Prior Publication Data

US 2021/0152471 A1    May 20, 2021

(30) Foreign Application Priority Data

Nov. 15, 2019    (KR) .......................... 10-2019-0147205

(51) Int. Cl.
*H04L 45/74*    (2022.01)
*H04L 67/104*    (2022.01)
*H04L 43/0864*    (2022.01)

(52) U.S. Cl.
CPC .......... *H04L 45/74* (2013.01); *H04L 43/0864* (2013.01); *H04L 67/104* (2013.01)

(58) Field of Classification Search
None
See application file for complete search history.

(56) References Cited

U.S. PATENT DOCUMENTS

| 2019/0081777 | A1 | 3/2019 | Klarman et al. |
| 2019/0182029 | A1 | 6/2019 | Yim et al. |
| 2019/0182313 | A1 | 6/2019 | Yoo et al. |
| 2019/0349426 | A1* | 11/2019 | Smith ...................... H04W 4/08 |
| 2021/0281578 | A1* | 9/2021 | Olson ...................... H04L 63/20 |
| 2022/0126864 | A1* | 4/2022 | Moustafa ......... G08G 1/096758 |

FOREIGN PATENT DOCUMENTS

KR    10-1727525 B1    4/2017

* cited by examiner

*Primary Examiner* — Robert M Morlan
(74) *Attorney, Agent, or Firm* — LRK PATENT LAW FIRM (57) ABSTRACT

A relay network system includes a plurality of relay nodes connected to each other to constitute a relay network and one or more blockchain peer nodes connected to the relay nodes. Each relay node receives at least one of a connection packet including connection request information and a block packet including block information at the user level, transmits the block packet to a connected blockchain peer node and another relay node, and updates a connection information table so that information on the connection to the blockchain peer node and relay node connected to transmit or receive the block packet corresponds to the connection packet.

20 Claims, 7 Drawing Sheets

RELAY NODE, RELAY NETWORK SYSTEM AND OPERATING METHOD THEREOF

CROSS-REFERENCE TO RELATED APPLICATION

This application claims priority to and the benefit of Korean Patent Application No. 2019-0147205, filed on Nov. 15, 2019, the disclosure of which is incorporated herein by reference in its entirety.

BACKGROUND

1. Field of the Invention

The present invention relates to blockchain technology, and more specifically, to a relay node capable of processing packets at the user level, a relay network system, and an operating method thereof.

2. Description of Related Art

Currently, there are various public blockchain platforms such as Bitcoin and Ethereum, but they have remarkably insufficient performance for use in real-life services.

In particular, it is necessary to maintain the security of a blockchain while improving transactions per second (TPS), which is the representative performance of the blockchain, but for this purpose, shortening block propagation time must be preceded.

Conventionally, various studies have been conducted to shorten block propagation time, but the conventional technology supports only a single blockchain or has a relay node implementation method which does not deviate significantly from the existing blockchain client implementation. Thus, there are limitations in terms of delay and scalability.

SUMMARY OF THE INVENTION

An embodiment of the present invention provides a low-delay block relay node specialized for block propagation, a relay network system composed of such relay nodes, and an operation method thereof in order to shorten block propagation time.

However, the technical object to be achieved by the present embodiment is not limited to the above-mentioned technical object, and other technical objects may be present.

According to a first aspect of the present invention, there is provided a relay node configured to include a memory and a processor for executing a program stored in the memory and connected to one or more of a blockchain peer node and another relay node, the relay node including a packet transceiving unit configured to transmit or receive at least one of a connection packet including connection request information and a block packet including block information, a block packet processing unit configured to transmit the block packet to the connected blockchain peer node and relay node through the packet transceiving unit; a connection packet processing unit configured to update a connection information table so that information on the connection to the blockchain peer node and relay node connected to transmit or receive the block packet corresponds to the connection packet; and a user-level packet processing unit configured to process the connection packet and the block packet at a user level.

In an embodiment, the packet transceiving unit may include a packet reception unit configured to read a packet from a network interface card through the user-level packet processing unit, identify whether the packet corresponds to a block packet or a connection packet, and store a result of the identification in a memory.

In an embodiment, the relay node may further include a blockchain type identification unit configured to identify a blockchain platform corresponding to the read packet.

In an embodiment, the packet transceiving unit may replicate a payload of the received block packet as many times as the number of correspondent nodes to which the payload will be transmitted, create a packet header for an IP address and a port number of each of the correspondent nodes on the basis of the connection information table, combine the created packet header with the payload, and transmit a finally completed packet through a network interface card.

In an embodiment, the packet transceiving unit may include a transmission control protocol (TCP) block transmission unit configured to read the block information from the received block packet using a TCP stack of the user-level packet processing unit and transmit the block packet using TCP connection information of the connected blockchain peer node.

In an embodiment, the connection information may include one or more of blockchain platform type information, correspondent node IP address information, protocol type information, port number information used for block transmission, and recently transmitted block number information.

In an embodiment, the user-level packet processing unit may be a data plane development kit (DPDK).

Also, according to a second aspect of the present invention, there is provided a relay network system including a plurality of relay nodes connected to each other to constitute a relay network and one or more blockchain peer nodes connected to the relay nodes, wherein each relay node receives at least one of a connection packet including connection request information and a block packet including block information at a user level, transmits the block packet to a connected blockchain peer node and another relay node, and updates a connection information table so that information on the connection to the connected blockchain peer node and relay node corresponds to the connection packet when the transmission is completed.

In an embodiment, the relay network system may further include a relay manager configured to provide an IP address and a port number of a relay node to which a corresponding node is to be connected with reference to a relay node table upon a request from the relay node and the blockchain peer node to connect to the relay network.

In an embodiment, the relay node table may include one or more of information on the number of connections of the blockchain peer node, information on the number of connections of the relay node, block reception bandwidth information, and block transmission bandwidth information, which are periodically updated by the relay node.

In an embodiment, when the connection request is received from the relay node, the relay manager may preferentially allocate a relay node having the shortest round trip time (RTT) to the relay node that has made the connection request among a plurality of candidate relay nodes.

In an embodiment, the relay manager may compare an RTT at the time of directly connecting to each of the plurality of candidate relay nodes and an RTT at the time of connecting via the preferentially allocated relay node and allocate the corresponding candidate relay node for additional direct connection when the RTT at the time of the direct connection is less than a preset multiple of the RTT at the time of the via-connection.

In an embodiment, the relay node may update one or more of information on the number of currently connected blockchain peer nodes, information on the number of other relay nodes, block reception bandwidth information, and block transmission bandwidth information using the relay manager.

In an embodiment, when the blockchain peer node requests the relay manager to connect to the relay network, a relay node may be allocated by the relay manager and connected to the blockchain peer node.

In an embodiment, when the connection request is received from the blockchain peer node, the relay manager may allocate a relay node having the shortest RTT to the blockchain peer node, a block transmission/reception bandwidth not exceeding a predetermined bandwidth, and connections of the blockchain peer node not exceeding an upper limit number.

Also, according to a third aspect of the present invention, there is provided a relay node operating method connected to one or more of a blockchain peer node and another relay node, the operating method including receiving a packet, determining whether the received packet is a connection packet including connection request information or a block packet including block information, transmitting the block packet to the connected blockchain peer node and relay node, and updating a connection information table so that information on the connection to the blockchain peer node and the relay node corresponds to the connection packet when the block packet is transmitted, wherein the connection packet and the block packet are processed at a user level.

In an embodiment, the receiving of a packet may include reading a packet from a network interface card at the user level, storing a result of the identification in a memory when the packet is identified as corresponding to the block packet or the connection packet, and identifying a blockchain platform corresponding to the read packet.

In an embodiment, the transmitting of the block packet to the connected blockchain peer node and relay node may include replicating a payload of the received block packet as many times as the number of correspondent nodes to which the payload will be transmitted using UDP at the user level, creating a packet header for an IP address and a port number of each of the correspondent nodes on the basis of the connection information table, and combining the created packet header with the payload and transmitting a finally completed packet through a network interface card.

In an embodiment, the transmitting of the block packet to the connected blockchain peer node and relay node may include reading the block information of the received block packet using a TCP stack at the user level and transmitting the block packet using TCP connection information of the connected blockchain peer node.

In an embodiment, the connection information may include one or more of blockchain platform type information, correspondent node IP address information, protocol type information, port number information used for block transmission, and recently transmitted block number information.

A computer program according to the present invention for solving the above-described problems is combined with a computer, which is hardware, to execute the relay node operating method and is stored in a medium.

In addition, other methods and systems for implementing the present invention and a computer-readable recording medium having a computer program recorded thereon to execute the methods may be further provided.

Other specific details of the present invention are included in the detailed description and drawings.

DETAILED DESCRIPTION OF EXEMPLARY EMBODIMENTS

Advantages and features of the present invention, and implementation methods thereof will be clarified through the following embodiments described in detail with reference to the accompanying drawings. However, the present invention is not limited to embodiments disclosed herein and may be implemented in various different forms. The embodiments are provided for making the disclosure of the present invention thorough and for fully conveying the scope of the present invention to those skilled in the art. It is to be noted that the scope of the present invention is defined by the claims.

The terminology used herein is for the purpose of describing particular embodiments only and is not intended to be limiting to the invention. As used herein, the singular forms "a," "an," and "one" include the plural unless the context clearly indicates otherwise. The terms "comprises" and/or "comprising" used herein specify the presence of stated elements but do not preclude the presence or addition of one or more other elements. Like reference numerals refer to like elements throughout the specification, and the term "and/or" includes any and all combinations of one or more of the associated listed items. It will be also understood that, although the terms first, second, etc. may be used herein to describe various elements, these elements should not be limited by these terms. These terms are only used to distinguish one element from another. Thus, a first element could be termed a second element without departing from the technical spirit of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention relates to a relay node 100, a relay network system 1, and an operating method thereof.

An indicator that is most used when measuring the performance of the blockchain platform is transactions per second (TPS). Bitcoin and Ethereum have low TPS, i.e., 7 TPS and 20 TPS, respectively.

There are two main reasons for the low TPS of the blockchain platform.

First, the size of one block is not large enough to contain many transactions. Second, the speed of creating a new block is not fast enough.

For example, in the case of Bitcoin, the size of one block is 1 MB, and one block is created every 10 minutes.

In the above environment, it is possible to increase the TPS by increasing the block size or increasing the block creation speed, but both of the methods have limitations due to another performance factor, i.e., block propagation time.

Here, the block propagation time refers to the time it takes for a newly created block to be delivered to all nodes participating in a network.

When a miner creates a block during a basic operation for a blockchain, the block is gradually propagated to nodes participating in the blockchain through a peer-to-peer (P2P) network.

At this time, when the block size is increased to increase the TPS, the amount of data to be transmitted between peers increases, and thus the block propagation time increases.

If the block propagation time is longer than a block creation cycle, it is essentially impossible to keep a blockchain ledger up to date, because another new block is created before a node receives a new block.

On the other hand, when the block creation speed is increased to increase the TPS, the block creation cycle may become lower than the block propagation time, which results in more frequent forks that lowers the security of the blockchain, because the ledger is maintained differently between participating nodes depending on the block propagation state.

In conclusion, in order to maintain the security of the blockchain while improving the TPS, which is the representative performance of the blockchain, it must be preceded by shortening the block propagation time.

Meanwhile, in order to shorten the block propagation time, various studies such as block compression and block transmission protocol between peers have been conducted.

In the related art, however, a fundamental limitation that occurs in an unstructured P2P network, which is a general public blockchain network, is pointed out. A need for a relay node specialized for block propagation and a relay network to which such relay nodes are connected has emerged, rather than a general node with a limited number of peer connections and a limited bandwidth.

However, a conventional relay node and network that have been proposed support only a single blockchain platform (Bitcoin) or have a relay node implementation method which does not deviate significantly from the existing blockchain client implementation. Thus, there are limitations in terms of delay and scalability.

In contrast, an embodiment of the present invention provides a high-speed packet processing and delivery method for creating a low-latency block relay node supporting various types of blockchain platforms and also provides a block transmission method between relay nodes 100, a block transmission method between a relay node 100 and a peer node 200, and an efficient relay network structure building method.

Hereinafter, embodiments of the present invention will be described in detail with reference to the accompanying drawings.

Figure 1:
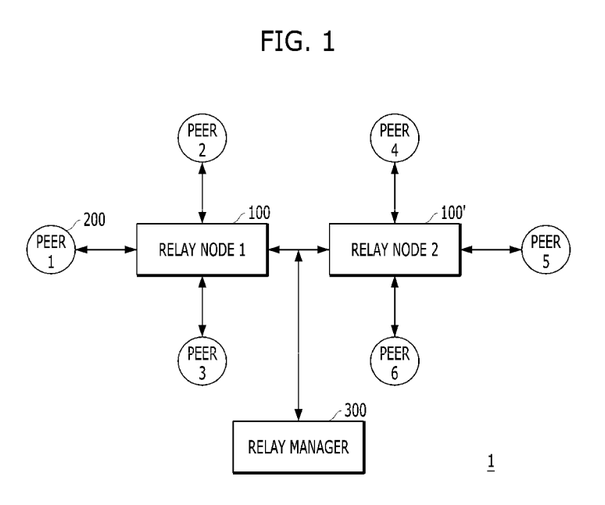
FIG. 1 is a diagram illustrating a relay network system according to an embodiment of the present invention.

FIG. 1 is a diagram illustrating a relay network system 1 according to an embodiment of the present invention.

The relay network system 1 according to an embodiment of the present invention includes a relay node 100 and a blockchain peer node 200.

As shown in FIG. 1, a plurality of relay nodes 100 are connected to one or more blockchain pear nodes 200. Alternatively, a relay node 100 may be connected to another relay node to constitute a network.

Also, each of the blockchain peer nodes 200 is connected to one relay node 100.

In this case, the relay network shown in FIG. 1 is only one of several examples, and in an actual network, a larger number of relay nodes 100 may be connected to the blockchain peer node 200.

That is, one relay node may be connected to two or more blockchain peer nodes and may be connected to two or more relay nodes.

According to an embodiment, the relay node 100 according to the present invention may be simultaneously connected to various kinds of blockchain peer nodes 200 such as Bitcoin and Ethereum.

In this case, the relay node 100 may be connected to various kinds of blockchain peer nodes using a peer connection protocol of a blockchain platform that the blockchain peer node 200 uses.

Meanwhile, a public blockchain platform, such as Bitcoin and Ethereum, basically uses the transmission control protocol (TCP) for connection and block transmission to the blockchain peer node 200. The relay node 100 according to an embodiment of the present invention may also provide a function of maintaining the TCP connection required by the blockchain peer node 200.

Also, according to an embodiment of the present invention, the relay node 100 may provide a UDP port for block transmission instead of TCP connection when the blockchain platform supports the user datagram protocol (UDP).

The relay node 100 according to an embodiment of the present invention will be described in more detail below with reference to FIG. 2.

Figure 2:
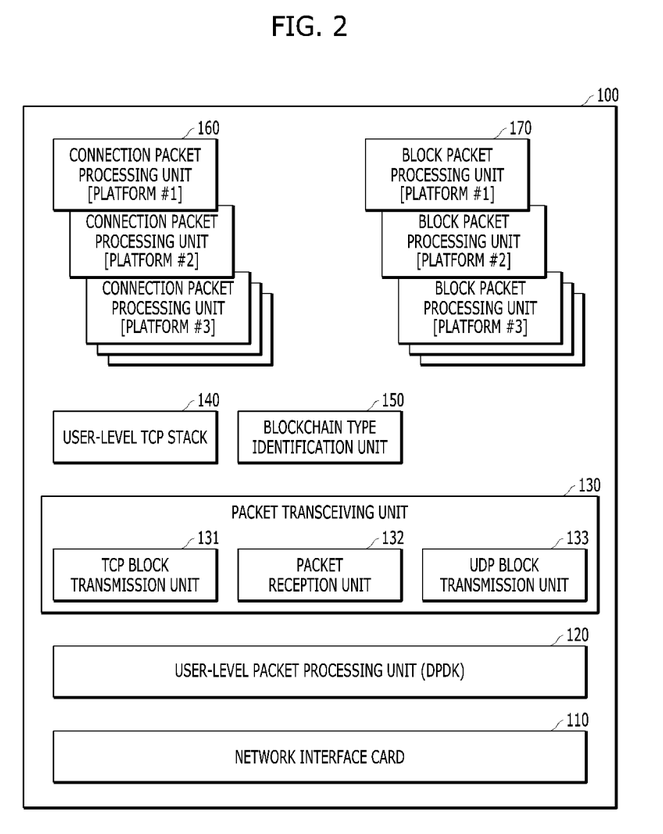
FIG. 2 is a block diagram illustrating a relay node according to an embodiment of the present invention.

FIG. 2 is a block diagram illustrating a relay node 100 according to an embodiment of the present invention.

The relay node 100 according to an embodiment of the present invention includes a packet transceiving unit 130, a blockchain type identification unit 150, a block packet processing unit 170, a connection packet processing unit 160, and a user-level packet processing unit 120.

Meanwhile, the relay node 100 may be implemented in the form of software on a commonly used physical server. For example, the relay node 100 may be implemented on an operating system such as Linux.

The packet transceiving unit 130 transmits and receives at least one of a connection packet and a block packet.

Here, the connection packet refers to a packet containing connection request information, and the block packet refers to a packet including block information.

In detail, according to an embodiment of the present invention, the packet transceiving unit 130 may include a packet reception unit 132 configured to read a packet from a network interface card 110 through the user-level packet processing unit 120, identify which of a block packet and a connection packet the packet corresponds to, and store a result of the identification in a memory 420.

That is, as described later, the user-level packet processing unit 120 may be a data plane development kit (DPDK), and the packet reception unit 132 may read a packet from the network interface card 110 using a poll-mode driver provided by the DPDK 120 and then store the packet in the memory 420.

Also, the packet reception unit 132 may classify whether the read packet is a connection packet or a block packet. In this case, the connection packet and the block packet may be classified by a destination port number of a packet header.

When the packet is read by the packet reception unit 132, the blockchain type identification unit 150 identifies a blockchain platform corresponding to the read packet.

That is, when a connection packet or a block packet is received from the packet reception unit 132, the blockchain type identification unit 150 may identify to which platform the packet belongs using a prestored blockchain platform signature.

Also, the packet transceiving unit 130 may include a UDP block transmission unit 133 and a TCP block transmission unit 131.

When a block packet is received, the UDP block transmission unit 133 replicates the payload of the received block packet as many times as the number of correspondent nodes to which the payload will be transmitted.

In this case, the UDP block transmission unit 133 may replicate the payload through the user-level packet processing unit 120. According to an embodiment, the UDP block transmission unit 133 may replicate the payload using a DPDK library.

Then, the UDP block transmission unit 133 may create a packet header for an IP address and a port number of a correspondent node on the basis of a connection information table managed by the connection packet processing unit 160, which will be described below, combine the created packet header with the payload, and transmit a finally completed packet through the network interface card 110.

When a block packet is received, the TCP block transmission unit 131 reads block information on the received block packet and transmits the block packet by using information on TCP connection to each blockchain peer node to which the TCP block transmission unit 131 is currently connected.

In this case, the TCP block transmission unit 131 may read the block information through the user-level packet processing unit 120. According to an embodiment, the TCP block transmission unit 131 may read the block information using a TCP stack of the DPDK.

Figure 3:
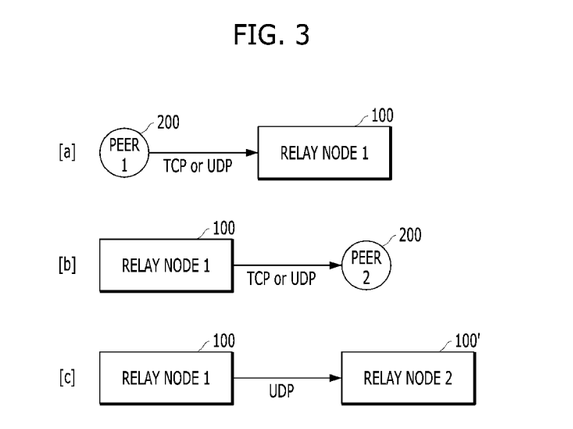
FIG. 3 is a diagram illustrating a relay node transmitting or receiving a block packet.

FIG. 3 is a diagram illustrating a relay node 100 transmitting or receiving a block packet.

One scheme may be selected from the TCP scheme and the UDP scheme and used to transmit or receive a blockchain between the relay node 100 and the blockchain peer node 200 according to pre-determination in a connection process with the blockchain peer node 200 as shown in FIGS. 3A and 3B.

Meanwhile, the UDP scheme is used, by default, for communication between relay nodes 100 and 100', as shown in FIG. 3C.

Referring to FIG. 2 again, the block packet processing unit 170 transmits a block packet to a blockchain peer node 200 and the relay node 100' connected to the relay node 100 through the packet transceiving unit 130.

According to an embodiment, when the received packet is a block packet, the block packet processing unit 170 may transmit the block packet to the blockchain peer node 200 and the relay node 100' connected to the relay node 100 without changing the block packet.

In this case, according to an embodiment of the present invention, the block packet processing unit 170 may transmit the block packet to the relay node 100' using the UDP block transmission unit 133.

Also, according to an embodiment, the block packet processing unit 170 may transmit the block packet to the blockchain peer node 200 by selectively using the TCP block transmission unit 131 and the UDP block transmission unit 133 as necessary with reference to protocol information upon initial connection.

The connection packet processing unit 160 updates the connection information table so that information on the connection to the blockchain peer node 200 and the relay node 100', which are connected to transmit or receive block packets, corresponds to a connection packet.

According to an embodiment, when the packet received from the packet reception unit 132 is a connection packet incoming from the blockchain peer node 200 or the relay node 100', the connection packet processing unit 160 may create a TCP connection using the user-level packet processing unit 120, for example, using the TCP stack of the DPDK upon a TCP connection request.

According to an embodiment, upon the UDP connection request, the connection packet processing unit 160 may return, to the corresponding node, a UDP port number through which a block packet is received.

In both cases, after connection establishment is completed, the connection packet processing unit 160 updates the connection information table with the corresponding connection information.

In this case, the connection information table manages connection information for the blockchain peer node 200 or the relay node 100' which is connected to transmit or receive a block.

According to an embodiment, the connection information managed by the connection information table may include one or more of blockchain platform type information, correspondent node IP address information, protocol type information, port number information used for block transmission, and block number information recently transmitted to a correspondent node.

Meanwhile, it will be appreciated that the block packet processing unit 170 and the connection packet processing unit 160 may be distinguished for each platform and provided in plural and that one processing unit may process a plurality of platforms.

The user-level packet processing unit 120 processes connection packets and block packets at the user level.

That is, an embodiment of the present invention is characterized in that, in order to process packets received and transmitted by the relay node 100 at high speeds, a separate user-level packet processing unit 120 is used instead of a kernel-level packet processing unit provided by an operating system.

The user-level packet processing unit 120 according to an embodiment of the present invention may provide high bandwidth and low delay and freely change packets according to the purpose compared to kernel-level packet processing.

According to an embodiment of the present invention, the Intel DPDK, which is the most commonly used user-level packet processing library, may be used, but the present invention is not limited thereto. It will be appreciated that the present invention may be implemented using a different type of user-level packet processing library as the same concept.

Meanwhile, as described above, according to an embodiment of the present invention, a packet transmitted or received by the relay node 100 includes two types of packets, i.e., a connection packet and a block packet.

In this case, according to an embodiment of the present invention, it is possible to maintain compatibility by using the standard format and protocol defined by the corresponding blockchain platform as an application layer protocol for the format or transmission of each packet.

According to an embodiment, a connection packet used between two relay nodes may be defined in a form containing only minimal functions on the UDP protocol.

According to an embodiment, a block packet used between relay nodes is used only for simple packet forwarding, and thus a packet format of a blockchain platform received by a first relay node may be used without an additional packet format or protocol.

Figure 4:
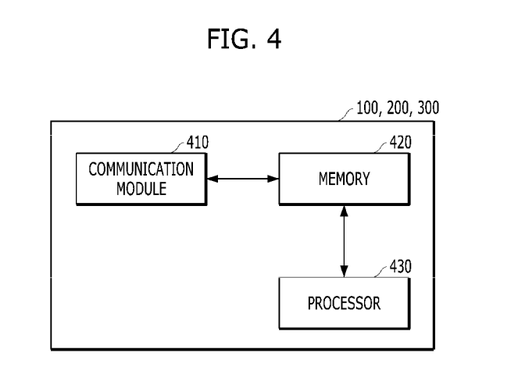
FIG. 4 is a block diagram illustrating a configuration of a relay network system according to an embodiment of the present invention.

Meanwhile, the relay network system 1 according to an embodiment of the present invention may further include a relay manager 300.

The relay node 100 is connected to one or more other relay nodes 100' to constitute a relay network, and the blockchain peer node 200 is connected to one relay node 100 to transmit or receive a block over the relay network.

In this process, according to an embodiment of the present invention, the relay manager 300 may be used to efficiently build a network structure.

In this case, the relay manager 300 may be implemented as a physical server separate from the relay node 100, but the present invention is not limited thereto. It will be appreciated that the relay manager 300 and the relay node 100 may be implemented on one server computer and executed through independent programs.

In detail, the relay manager 300 may provide an IP address and a port number of the relay node 100 to which a corresponding node is to be connected with reference to the relay node table upon a request from the relay node 100 and the blockchain peer node 200 to connect to the relay network.

Here, the relay node table may include one or more of information on the number of connections of the blockchain peer node, information on the number of connections of the relay node, block reception bandwidth information, and the block transmission bandwidth information, which are periodically updated by relay nodes.

When a connection request is received from the relay node 100, the relay manager 300 may preferentially allocate a relay node having the shortest round trip time (RTT) to the relay node 100 having requested the connection among a plurality of candidate relay nodes.

Then, the relay manager 300 may compare an RTT at the time of directly connecting to each of the plurality of candidate relay nodes and the RTT at the time of connecting via the preferentially allocated relay node. When the RTT at the time of the direct connection is less than a preset multiple (e.g., less than 1.5 times) of the RTT at the time of the via-connection, the relay manager 300 may allocate the relay node that satisfies the corresponding condition for additional direction connection.

Meanwhile, the relay node 100 may register the presence of the relay node 100 with the relay manager 300 at the time of initial startup.

Also, the relay node 100 may update one or more of information on the number of blockchain peer nodes currently connected to the relay node, information on the number of other relay nodes currently connected to the relay node, block reception bandwidth information, and the block transmission bandwidth information through periodic communication with the relay manager 300 during operation.

When the blockchain peer node 200 requests to connect to the relay network, the blockchain peer node 200 sends a connection request to the relay manager 300, and thus the relay node 100 is allocated by the relay manager 300 and used for the connection.

In this case, in response to the connection request of the blockchain peer node 200, the relay manager 300 may allocate one relay node that satisfies three conditions: the RTT to the blockchain peer node 200 is shortest; a predetermined block transmission/reception bandwidth is not exceeded; and the upper limit number of connections of the blockchain peer node is not exceeded.

In this case, according to the present invention, the relay manager 300 may allocate one relay node 100 that satisfies all of the above three conditions or, in some cases, may allocate one relay node 100 that satisfies one or more of the three conditions.

Meanwhile, for the fastest communication between relay nodes, it is most desirable that relay nodes should constitute a full mesh network.

However, in this case, the block transmission bandwidth between relay nodes may increase, and thus a bandwidth allocated to a blockchain peer node may decrease correspondently.

Accordingly, according to an embodiment of the present invention, it is possible to provide connectivity to all relay nodes on a relay network through connection to the closest relay node firstly according to the above-described conditions and then add direction connection secondarily according to the conditions to build an efficient network in order to compensate for performance so that indirect connection does not increase an RTT to a specific node too much.

FIG. 4 is a block diagram illustrating a configuration of a relay network system 1 according to an embodiment of the present invention.

Meanwhile, referring to FIG. 4, according to an embodiment of the present invention, each of the relay node 100, the blockchain peer node 200, and the relay manager 300 may include a communication module 410, a memory 420, and a processor 430.

The communication module 410 is for transmitting or receiving a block and various kinds of data between elements and may be implemented through a wired communication module or a wireless communication module.

A program for transmitting, receiving, and processing each piece of data is stored in the memory 420, and the processor 430 executes the program stored in the memory 420. Here, the memory 420 collectively refers to a non-volatile storage device, which maintains stored information even when no power is supplied, and a volatile storage device.

For example, the memory 420 may include a NAND flash memory such as a compact flash (CF) card, a secure digital (SD) card, a memory stick, a solid-state drive (SSD), or a micro SD card, a magnetic computer memory device such as a hard disk drive (HDD), and an optical disc drive such as a compact disc (CD)-read only memory (ROM) or a digital versatile disc (DVD)-ROM.

For reference, the elements illustrated in FIGS. 1 and 4 according to an embodiment of the present invention may be implemented as software or hardware such as a field-programmable gate array (FPGA) or an application-specific integrated circuit (ASIC) and may perform predetermined roles.

However, the elements are not limited to software or hardware and may be configured to be in an addressable storage medium or configured to activate one or more processors.

Accordingly, as an example, the elements include elements such as software elements, object-oriented software elements, class elements, and task elements, processes, functions, attributes, procedures, subroutines, program code segments, drivers, firmware, microcode, circuits, data, databases, data structures, tables, arrays, and variables.

Elements and functions provided by corresponding elements may be combined into a smaller number of elements or may be divided into additional elements.

An operation method of a relay node connected to one or more of a blockchain peer node and another relay node according to an embodiment of the present invention will be described below with reference to FIG. 5.

Figure 5:
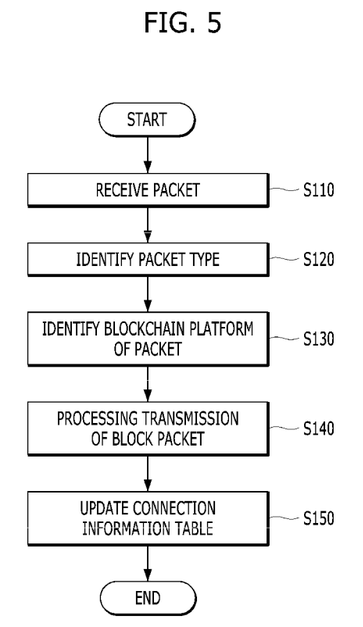
FIG. 5 is a flowchart illustrating a relay node operating method.

FIG. 5 is a flowchart illustrating a relay node operating method.

The operation of the relay node is started with the reception of a packet.

When a packet is received, the relay node determines whether the received packet is a connection packet including connection request information or a block packet including block information (S120).

Subsequently, the relay node identifies to which blockchain platform the received packet belongs (S130) and processes a block packet and a connection packet on a blockchain platform basis when the identification is completed.

In this case, since the relay node reads a packet from a network interface card at the user level and identifies whether the read packet is a block packet or a connection packet, the relay node may store a result of the identification in the memory and identify a blockchain platform corresponding to the read packet.

Subsequently, the relay node transmits the block packet to a blockchain peer node and another relay node connected to the relay node with reference to a connection information table (S140) and updates the connection information table so that information on connection to the blockchain peer node and relay node connected to the relay node corresponds to the connection packet when the block packet is transmitted (S150).

In the above description, operations S110 to S150 may be divided into sub-operations or combined into a smaller number of operations depending on the implementation of the present invention. Also, if necessary, some of the operations may be omitted, or the operations may be performed in an order different from that described above. Furthermore, although not described here, the above description with reference to FIGS. 1 to 4 may apply to the relay node operating method of FIG. 5.

Figure 6:
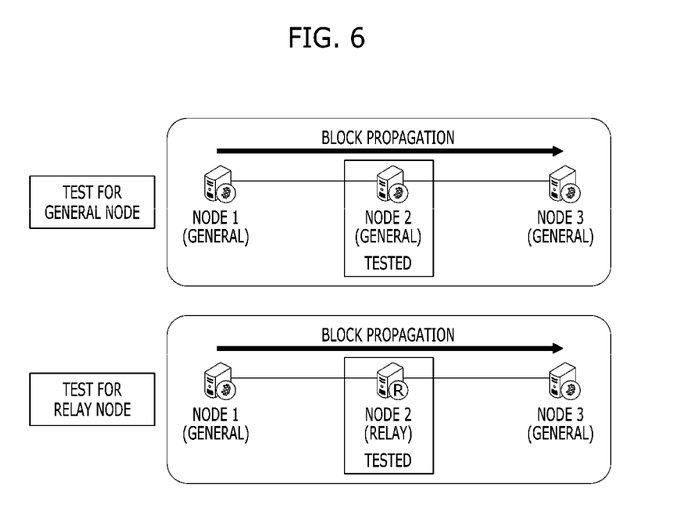
FIG. 6 shows a performance test environment according to an embodiment of the present invention.
Figure 7:
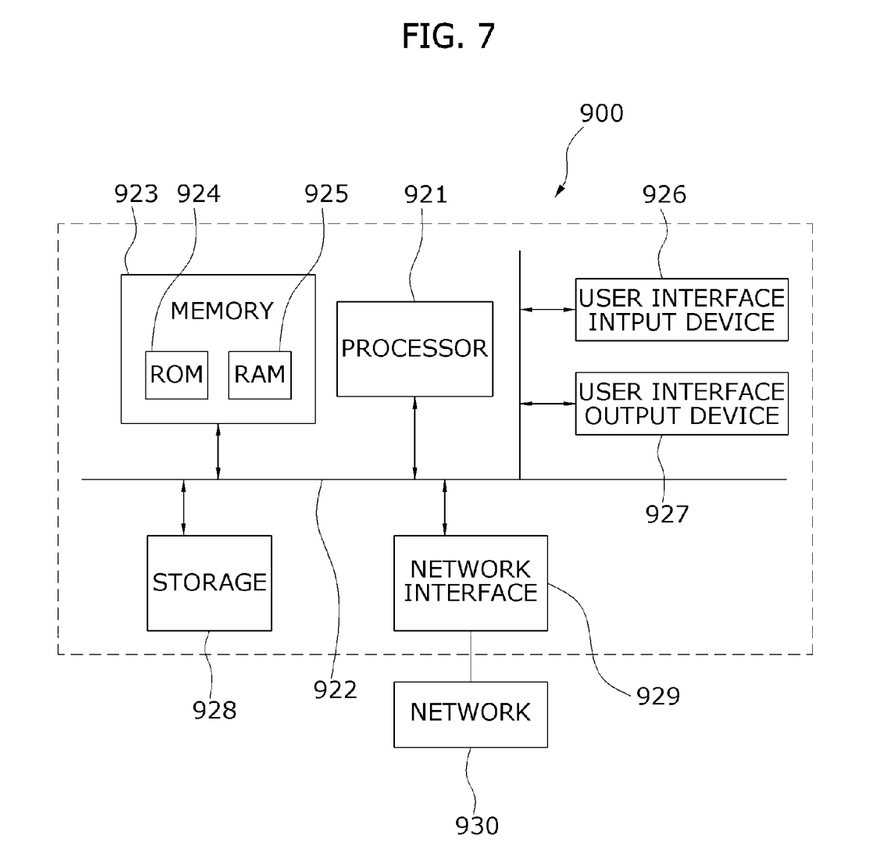
FIG. 7 is a view illustrating an example of a computer system in which a method according to an embodiment of the present invention is performed.

FIG. 6 is a diagram illustrating a performance test environment according to an embodiment of the present invention and shows a result of comparing the time required for passing through a general node (test for general node) and a relay node (test for relay node).

In order to measure the node passage time, a private Bitcoin network test environment was configured, and three nodes were connected to a back-to-back physical network to minimize the effect of propagation delay. Node 1 performs block generation, Node 2 performs passage, and Node 3 performs block reception.

Table 1 shows a performance test result according to an embodiment of the present invention. When a block relay node was used, a node passage time for one block was decreased by 2.05 ms, which means a decrease percentage of 37.63%.

TABLE 1

| | Node Passage Time of Block | | | |
|---|---|---|---|---|
| Round | General Peer Node (ms) | Relay Node (ms) | Decrease Time(ms) | Decrease Percent (%) |
| 1 | 4.144 | 2.378 | 1.766 | 42.62 |
| 2 | 8.355 | 5.062 | 3.293 | 39.41 |
| 3 | 3.574 | 2.471 | 1.103 | 30.86 |
| Average | 5.358 | 3.304 | 2.055 | 37.63 |

According to an embodiment of the present invention, block propagation time can be shortened when used in a block propagation path, and an increase in block size and an additional increase in performance is expected when a service is provided to multiple peers.

Polling-based packet processing and memory copy overhead reduction between kernel/user spaces are factors that improve block relay node performance.

An embodiment of the present invention may be implemented as a computer program stored in a computer-executable medium or a recording medium including computer-executable instructions. A computer-readable medium may be any available medium accessible by a computer and may include volatile and non-volatile media and discrete and integrated media. Also, a computer-readable medium may include both a computer storage medium and a communication medium. The computer storage medium includes volatile and non-volatile media and discrete and integrated media which are implemented in any method or technique for storing information such as computer-readable instructions, data structures, program modules, or other data. Typically, the communication medium includes computer-readable instructions, data structures, program modules, or other data of a modulated data signal such as a carrier or other transmission mechanisms and further includes any information transmission medium.

While the method and system 1 of the present invention are described with reference to specific embodiments, some or all of their elements or operations may be implemented using a computer system having a general-purpose hardware architecture.

The above description of the present invention is merely illustrative, and those skilled in the art should understand that various changes in form and details may be made therein without departing from the technical spirit or essential features of the invention. Therefore, the above embodiments are to be regarded as illustrative rather than restrictive. For example, each element described as a single element may be implemented in a distributed manner, and similarly, elements described as being distributed may also be implemented in a combined manner.

According to the above-described embodiment of the present invention, it is possible to implement a relay node responsible for only block propagation in a blockchain P2P network.

In particular, unlike the related art, low-delay block propagation with a higher bandwidth is possible through packet processing at the user level.

Also, it is possible to efficiently connect and manage a relay node and a blockchain peer node through a relay manager.

Advantageous effects of the present invention are not limited to the aforementioned effects, and other effects which are not mentioned here can be clearly understood by those skilled in the art from the following description.

The scope of the present invention is shown by the following claims rather than the foregoing detailed description, and all changes or modifications derived from the meaning and scope of the claims and their equivalents should be construed as being included in the scope of the present invention.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A relay node configured to include a memory and a processor for executing a program stored in the memory and connected to one or more of a blockchain peer node and another relay node, the relay node comprising:
   a packet transceiving unit configured to transmit or receive at least one of a connection packet including connection request information and a block packet including block information;
   a block packet processing unit configured to transmit the block packet to the connected blockchain peer node and relay node through the packet transceiving unit;

a connection packet processing unit configured to update a connection information table so that information on the connection to the blockchain peer node and relay node connected to transmit or receive the block packet corresponds to the connection packet; and a user-level packet processing unit configured to process the connection packet and the block packet at a user level.

2. The relay node of claim 1, wherein the packet transceiving unit comprises a packet reception unit configured to read a packet from a network interface card through the user-level packet processing unit, identify whether the packet corresponds to a block packet or a connection packet, and store a result of the identification in a memory.

3. The relay node of claim 2, further comprising a blockchain type identification unit configured to identify a blockchain platform corresponding to the read packet.

4. The relay node of claim 1, wherein the packet transceiving unit comprises a user datagram protocol (UDP) block transmission unit configured to replicate a payload of the received block packet as many times as the number of correspondent nodes to which the payload will be transmitted, create a packet header for an IP address and a port number of each of the correspondent nodes on the basis of the connection information table, combine the created packet header with the payload, and transmit a finally completed packet through a network interface card.

5. The relay node of claim 1, wherein the packet transceiving unit comprises a transmission control protocol (TCP) block transmission unit configured to read the block information from the received block packet using a TCP stack of the user-level packet processing unit and transmit the block packet using TCP connection information of the connected blockchain peer node.

6. The relay node of claim 1, wherein the connection information includes one or more of blockchain platform type information, correspondent node IP address information, protocol type information, port number information used for block transmission, and recently transmitted block number information.

7. The relay node of claim 1, wherein the user-level packet processing unit is a data plane development kit (DPDK).

8. A relay network system comprising:

a plurality of relay nodes connected to each other to constitute a relay network; and one or more blockchain peer nodes connected to the relay nodes, wherein each relay node receives at least one of a connection packet including connection request information and a block packet including block information at a user level, transmits the block packet to a connected blockchain peer node and another relay node, and updates a connection information table so that information on the connection to the blockchain peer node and relay node connected to transmit or receive the block packet corresponds to the connection packet when the transmission is completed.

9. The relay network system of claim 8, further comprising a relay manager configured to provide an IP address and a port number of a relay node to which a corresponding node is to be connected with reference to a relay node table upon a request from the relay node and the blockchain peer node to connect to the relay network.

10. The relay network system of claim 9, wherein the relay node table includes one or more of information on the number of connections of the blockchain peer node, information on the number of connections of the relay node, block reception bandwidth information, and block transmission bandwidth information, which are periodically updated by the relay node.

11. The relay network system of claim 9, wherein when the connection request is received from the relay node, the relay manager preferentially allocates a relay node having the shortest round trip time (RTT) to the relay node that has made the connection request among a plurality of candidate relay nodes.

12. The relay network system of claim 11, wherein:

the relay manager compares an RTT at the time of directly connecting to each of the plurality of candidate relay nodes and an RTT at the time of connecting via the preferentially allocated relay node, and the relay manager allocates the corresponding candidate relay node for additional direct connection when the RTT at the time of the direct connection is less than a preset multiple of the RTT at the time of the via-connection.

13. The relay network system of claim 9, wherein the relay node updates one or more of information on the number of currently connected blockchain peer nodes, information on the number of other relay nodes, block reception bandwidth information, and block transmission bandwidth information using the relay manager.

14. The relay network system of claim 9, wherein when the blockchain peer node requests the relay manager to connect to the relay network, a relay node is allocated by the relay manager and connected to the blockchain peer node.

15. The relay network system of claim 14, where when the connection request is received from the blockchain peer node, the relay manager allocates a relay node having the shortest RTT to the blockchain peer node, a block transmission/reception bandwidth not exceeding a predetermined bandwidth, and connections of the blockchain peer node not exceeding an upper limit number.

16. A relay node operating method in which a relay node is connected to one or more of a blockchain peer node and another relay node, the relay node operating method comprising:

receiving a packet;

determining whether the received packet is a connection packet including connection request information or a block packet including block information;

transmitting the block packet to the connected blockchain peer node and relay node; and updating a connection information table so that information on the connection to the blockchain peer node and the relay node corresponds to the connection packet when the block packet is transmitted, wherein the connection packet and the block packet are processed at a user level.

17. The relay node operating method of claim 16, wherein the receiving of a packet comprises:

reading a packet from a network interface card at the user level;

storing a result of the identification in a memory when the packet is identified as corresponding to the block packet or the connection packet; and identifying a blockchain platform corresponding to the read packet.

18. The relay node operating method of claim 16, wherein the transmitting of the block packet to the connected blockchain peer node and relay node comprises:

replicating a payload of the received block packet as many times as the number of correspondent nodes to which the payload will be transmitted using user datagram protocol (UDP) at the user level;
creating a packet header for an IP address and a port number of each of the correspondent nodes on the basis of the connection information table; and
combining the created packet header with the payload and transmitting a finally completed packet through a network interface card.

19. The relay node operating method of claim 16, wherein the transmitting of the block packet to the connected blockchain peer node and relay node comprises:
reading the block information of the received block packet using a TCP stack at the user level; and
transmitting the block packet using TCP connection information of the connected blockchain peer node.

20. The relay node operating method of claim 16, wherein the connection information includes one or more of blockchain platform type information, correspondent node IP address information, protocol type information, port number information used for block transmission, and recently transmitted block number information.

* * * * *